Oct. 4, 1949.  R. A. BECWAR  2,483,801
INTERMEDIATE FREQUENCY UNIT
Filed March 1, 1946
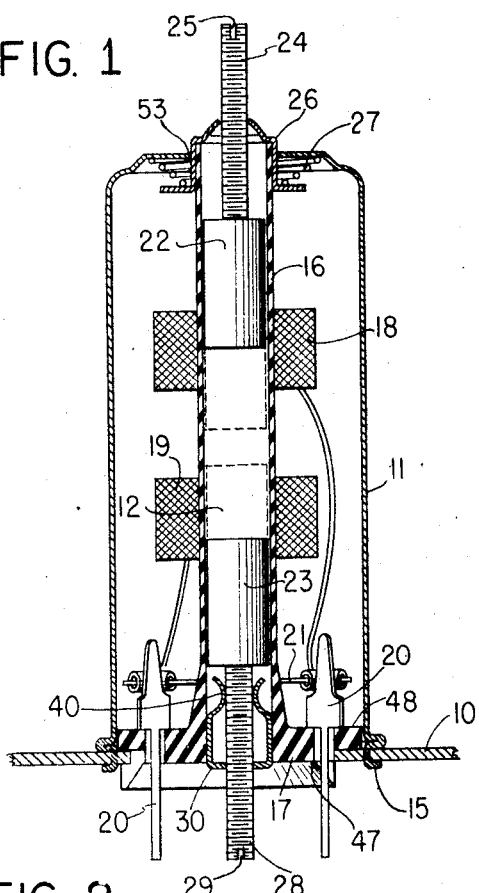
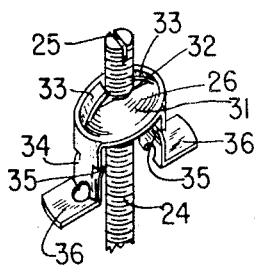
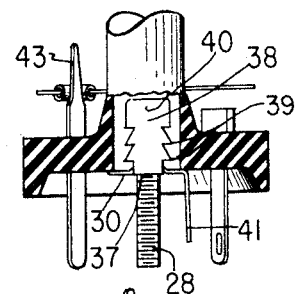
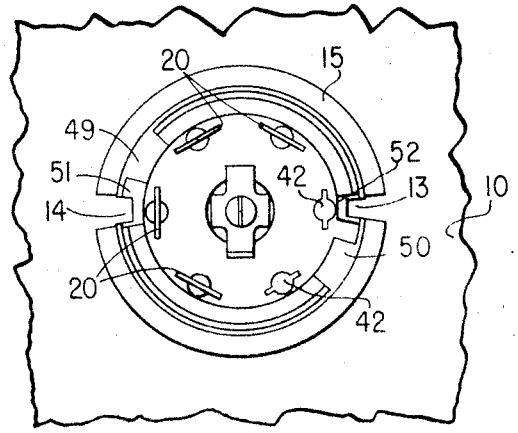
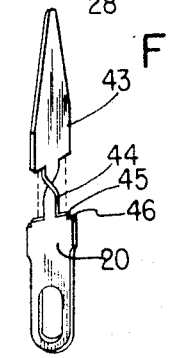
INVENTOR.
Rudolph A. Becwar
BY
Mueller and Mason
Attorneys Patented Oct. 4, 1949

2,483,801

UNITED STATES PATENT OFFICE 2,483,801

INTERMEDIATE FREQUENCY UNIT

Rudolph A. Becwar, Berwyn, Ill., assignor to Motorola, Inc., a corporation of Illinois Application March 1, 1946, Serial No. 651,399

3 Claims. (Cl. 175—359)

1

This invention relates generally to coil units and in particular to an intermediate frequency coil assembly for a radio receiver which is adapted to be removably positioned in a shielding can which is permanently fastened to the chassis of the radio receiver.

In the prior art, the construction of intermediate frequency coil units and the mounting of these units on a radio receiver chassis have been of two types. In one type the coil unit is mounted on the chassis and the shielding can thereafter placed over the coil unit and secured to the chassis by spade bolts or other securing means. This method has not proven satisfactory as the means for removably securing the cans to the chassis are relatively expensive and frequently become loose. Loose coil cans invite poor electrical grounding condition which, due to the proximity of the can to a tuned circuit, may cause a noisy circuit condition. In the second type of construction, the coil units and shielding cans are made as a unit and the unit secured to the radio chassis. This construction makes for difficult servicing of the unit and is subject to the same mechanical objections as in first method.

It is an object of the present invention to provide an improved intermediate frequency coil assembly which is of inexpensive construction and which eliminates the above stated difficulties.

It is a further object of the invention to provide an intermediate frequency coil assembly having a shielding can which is permanently secured to the radio receiver chassis, with the electrical components of the unit being removably positioned within the shielding can.

It is an additional object of this invention to provide an intermediate frequency coil unit wherein the terminals of the coils and the adjusting means for the cores are readily accessible for servicing without removing the unit from the radio chassis.

A feature of this invention is the provision of an intermediate frequency coil assembly including an open-ended shielding can permanently secured in an opening in the radio set chassis and a coil unit having electrical components mounted on a coil form, adapted to be removably positioned in said shielding can and having means thereon registering with means on said chassis for retaining the coil unit in the shielding can.

A further feature of this invention is the provision of an intermediate frequency coil unit including a coil form having a tubular portion and a base portion with coils wound on the tubular portion and terminals for the coils on the base portion, the coil unit being adapted to be positioned in a shielding can with the base portion of the coil form positioned in an opening in the shielding can to permit access to said terminal for servicing without removal of the coil form from the shielding can.

A still further feature of this invention is the provision of an intermediate frequency coil unit having a coil form with a base portion thereon for terminals of the coils and improved terminals on said base portion which provide the connections required in a small space.

Another feature of this invention is the provision of an intermediate frequency coil unit having a coil form with primary and secondary coils wound thereon and coil members positioned therein and simple and effective means on the ends of said coil form for adjustably positioning said cores with respect to said coils and for grounding said cores.

Further objects, features and advantages of this invention will be apparent from a consideration of the following description taken in connection with the accompanying drawings, in which:

Fig. 1 is a cross sectional view of the coil unit of this invention showing the shielding can secured to a section of the radio chassis;

Fig. 2 is a bottom view of the structure of Fig. 1;

Fig. 3 is a perspective view showing the details of the construction of the means for securing the top core member to the coil form;

Fig. 4 is a detailed cross sectional view showing the construction of the clip for securing the lower core member to the coil form; and Fig. 5 is a perspective view of one of the terminals in accordance with this invention.

In practicing my invention I provide an intermediate frequency coil unit with primary and secondary coils wound on an insulating coil form and movable iron cores associated with said coils positioned therein. The insulating coil form includes integral tubular and base portions and the two together carry all of the coil and terminal components of the unit. This assembly is positioned within a shielding can which is irremovably secured to the metal radio chassis in a position about a chassis opening. The coil unit is adapted to be moved in and out of the can through said opening for initial assembly and later for servicing and to be removably locked to the edge of said chassis opening. Simple and inexpensive coil terminals and core mounting structures are provided on the coil form.

Referring now to the drawings, in Figs. 1 and 2 is shown a portion of the chassis 10 of a radio receiver, and an intermediate frequency coil assembly including a shielding can 11 and a coil unit 12 mounted thereon. The chassis member 10 has a generally circular opening therein with projections 13 and 14 projecting into the opening on the opposite sides thereof. The shielding can 11 has an annular groove 15 formed on the open end thereof which engages said opening in the chassis member around the entire edge thereof except at said projection. The shielding can 11 is permanently fastened to the chassis 10 by the groove 15 in such a manner that the can will not loosen and require attention. The intermediate frequency coil unit 12 includes a coil form made of molded insulating material having a tubular portion 16 and a base portion 17 at the bottom end thereof. Primary and secondary coils 18 and 19 are wound on the tubular portion of the coil and are connected to terminals 20 on the base portion 17 of the coil form in the manner shown in Fig. 1. Dual silver coated mica wafer condensers 21 are mounted on the terminals 20 and are connected to the primary and secondary coils for capacity loading of the coils.

Cores 22 and 23 are provided within the tubular portion 16 and are adjustably positioned within the tubular portion for relative movement with respect to the coils. The core 22 positioned at the top of the coil unit includes a threaded extension 24 having a screw driver slot 25 in the end thereof. The extension 24 is threaded in a clip 26 which is secured to the top of the coil form in a manner to be explained. A spring 27 is suported by the clip 26 and is positioned between the clip and the shielding can 11 to ground the core 22 to the shielding can and radio chassis and to exert a downward force against clip 26 thereby keeping coil form 12 locked in position on projections 13 and 14. The lower core member 23 has an extension 28 with a screw driver slot 29 in the end thereof. The construction of the two cores and extensions thereon are identical and the two members are completely interchangeable. A clip 30 is provided in the base portion of the coil form having a formed thread opening engaging the extension 28 for retaining the core 23 in the desired position in the coil form.

The detailed constructions of the clips for holding the cores in position are shown in Figs. 3 and 4. In Fig. 3 it is seen that the clip 26 is a stamped metal part having a top portion 31 with a formed thread opening 32 therein for receiving the extension 24 and clamping members 33 for lockingly engaging the threads of the extension 24 to prevent unintentional movement of the core with respect to the clip. The clip 26 has side portions 34 with prongs 35 thereon for securing the clip to the top of the molded coil form 16 and extending portions 36 on the side portions for supporting the spring 27 as previously described. It is seen in Fig. 4 that the clip 30 is also a stamped metal part having a formed thread opening 37 therein for receiving the extension 28. The clip includes side members 38 fitting into the opening of the coil form and having prongs 39 for securing the clip to the coil form. Clamping portions 40 are provided at the top of the members 38 as clearly shown in Fig. 1 for engaging the threaded extension 28 to prevent accidental movement of the core with respect to the coil form. A terminal 41 is also provided on the clip 30 for grounding the core 23.

In order to provide all the terminals required on the small base portion of the coil form, a terminal arrangement requiring very little space is necessary. According to the invention terminals 20 are mounted in slots 42 molded in the base portion 17. As shown in Fig. 2, the slots are of rectangular cross section with a cylindrical central portion. In Fig. 2 four of the slots are shown with terminals placed therein and two without the terminals to show the configuration of the slots. Each of the terminals 20 (Fig. 5) has a top portion 43 of such cross section that it can be inserted in the rectangular portion of the slot and a restricted intermediate portion 44 of such width that it can be turned in the cylindrical portion of the slot. The bottom portion of the terminal includes a small section 45 of the same cross section as the portion 43 which will extend into the slot and a shoulder 46 which will prevent the terminal from extending farther into the slot. The terminals 20 are inserted in the base portion from the bottom as shown in Fig. 1 with the shoulder 46 in abutment with the lower face 47 of base portion 17 of the coil form. The length of portions 44 and 45 are such that when the shoulder 46 is in abutment with said lower face 47 the bottom edge of the portion 43 is flush with the top face 48 of the base portion. The terminals are secured in the base portion by twisting the top portion 43 with respect to the lower portion of the terminal causing the restricted portion 44 to be twisted as shown in Fig. 5. The twist of the portion 44 decreases the length of this portion as is well known causing the top portion 43 and the shoulder 46 to engage the faces 47 and 48 of the base portion for securely fastening the terminal to the said base portion. It will be noted that in mounting the terminals no soldering or difficult crimping of the terminal to the base member is required. The terminal 20 is of such configuration that it can be very easily made and the opening 42 can be molded in the base portion. It is apparent that the assembly of the terminal on the base portion is a very simple operation.

As previously stated, the coil unit 12 is movably positioned in the shielding can 11. The can 11 has an opening 53 at the top thereof through which the clip 26 and the extension 24 extend when the coil is inserted in the can. The spring 27 bears against the end of the can to position the coil unit with respect to the shielding can 11. The base portion 17 has slots 49 and 50 in the edge thereof interfitting with the projections 13 and 14 on the chassis to permit the base portion to be inserted through the opening in the chassis member 10. When the coil unit is positioned in the shielding can, the spring 27 is compressed and the unit is inserted until the base portion is beyond the projections on the chassis. The unit is then turned in a clockwise direction as shown in Fig. 2 so that the projections 13 and 14 rest against recesses 51 and 52 on the base portion for holding the coil in the can. As is apparent, the coil unit can be removed from the shielding can by depressing the base portion and rotating it in a counter clockwise direction until the projections 13 and 14 fit in the slots 50 and 49 in the base portion and allowing the coil unit to be removed from the shielding can.

The arrangement for removing the coil unit from the shielding can and the arrangement for adjusting the position of the cores makes for easy servicing of the assembly. As the extensions 24 and 28 for adjusting the position of the core members are both accessible on the exterior of the shielding can, adjustment thereof can be made without removing the coil unit from the can. Also the terminals 20 for the coils and the terminal 41 for grounding the core 23 are accessible at the opening in the chassis. The core 22 is automatically grounded to the chassis by clip 26, spring 27, and the shielding can 11, and hence a terminal for grounding this core is not necessary.

It is apparent from the above description that an intermediate frequency coil assembly is provided in which the components thereof are molded or stamped or otherwise adapted to be constructed in a very simple and inexpensive manner and so arranged that the assembly of the components into a coil assembly may be accomplished in an easy manner. The clips 26 and 30, although of very simple construction, perform all the necessary functions of engaging the extensions of the cores for adjustably positioning said cores with respect to the coils, lockingly engaging said extensions against unintentional movement thereof and grounding said cores. The spring and recess arrangement for removably securing the coil unit to the shielding can permits the shielding can to be permanently secured to the chassis avoiding the difficulties previously encountered of the shielding can becoming loose. The spring and recess arrangement also provides a much simpler and less expensive means for mounting the coil unit on the chassis than has heretofore been used. The coil assembly is further simplified by utilization of terminals 20 which requires a very small amount of space, are of very simple construction, and may be very easily mounted on the base of the coil form.

Although the invention has been described in connection with the preferred embodiment thereof, it is apparent that various changes and modifications can be made therein which are within the intended scope of the invention as defined in the appended claims.

I claim:

1. In a radio receiver, a chassis for mounting components of the radio receiver thereon having a circular opening therein and projecting portions extending into said opening on the opposite sides thereof, and an intermediate frequency coil assembly mounted on said chassis including an intermediate frequency coil unit and a shielding can therefor, said shielding can having an open end with a groove thereon which is firmly secured to said chassis at said opening, said coil unit including a coil form having a tubular portion and an extended annular base portion at one end thereof, primary and secondary coils wound on said tubular portion and core members positioned inside said tubular portion having extensions projecting out the opposite ends thereof, a first clip secured to said tubular portion at the end remote from said base portion engaging one of said core extensions, spring means supported by said first clip, a second clip secured to said base portion engaging the other core extension and including a terminal for grounding this extension, terminals on said base portion for making electrical connection to said coils, said base portion having recesses thereon registering with said projecting portions and cooperating with said spring means for removably positioning said coil unit in said shielding can, said spring means being adapted to automatically ground said first clip when said coil unit is supported in said shielding can.

2. In a radio receiver, a chassis for mounting components of the radio receiver thereon having a circular opening therein and projecting portions extending into said opening on the opposite sides thereof, and an intermediate frequency coil assembly mounted on said chassis including an intermediate frequency coil unit and a shielding can therefor, said shielding can having an open end and a substantially closed end with a small opening therein and being secured to said chassis with said open end of said can registered with said opening in said chassis, said coil unit including a coil form having a tubular portion and a base portion at one end of said tubular portion, primary and secondary coils wound on said tubular portion and terminals therefor mounted on said base portion, core members positioned within said tubular portion having extensions projecting out the ends thereof, a first clip secured to said tubular portion at the end thereof remote from said base portion engaging the extension of one of said core members and having spring means thereon for grounding said one core member, a second clip secured to said base portion engaging the extension of the other of said core members and including a terminal for grounding the same, said coil unit being adapted to be inserted in said shielding can with said extension of said one core member extending through said small opening in said shielding can and said spring means contacting said substantially closed end of said shielding can for supporting said coil form and for electrically grounding said one core member to said shielding can, said base portion being positioned in said opening in said chassis and having recesses registering with said projecting portions for retaining said coil unit in said shielding can, with said terminals and said extensions being accessible without removing said coil unit from said shielding can.

3. In a radio receiver, a chassis for mounting components of the radio receiver thereon having a circular opening therein and projecting portions extending into said opening on the opposite sides thereof, and a coil assembly mounted on said chassis including a coil unit and a shielding can therefor, said shielding can having an open end with a groove thereon which is firmly secured to said chassis at said opening, said coil unit including a coil form having a tubular portion and an extended annular base portion at one end thereof, a pair of coils wound on said tubular portion and core members positioned inside said tubular portion having extensions projecting out the opposite ends thereof, a first clip secured to said tubular portion at the end remote from said base portion engaging one of said core extensions, resilient means supported by said first clip, a second clip secured to said base portion engaging the other core extension and including a terminal for grounding this extension, terminals on said base portion for making electrical connection to said coils, said base portion having recesses thereon registering with said projecting portions and cooperating with said resilient means for removably positioning said coil unit in said shielding can, said resilient means being adapted to automatically ground said first clip when said coil unit is supported in said shielding can.

RUDOLPH A. BECWAR.

(References on following page)

REFERENCES CITED

The following references are of record in the file of this patent:

UNITED STATES PATENTS

| Number | Name | Date |
|---|---|---|
| 1,676,744 | Pickard | July 10, 1928 |
| 1,911,610 | Doughlas | May 30, 1933 |
| 2,109,771 | Franklin | Mar. 1, 1938 |
| 2,158,127 | Jacob et al. | May 16, 1939 |
| 2,158,613 | Laughlin | May 16, 1939 |
| 2,165,467 | Earnshaw | July 11, 1939 |
| 2,165,575 | Polydoroff | July 11, 1939 |
| 2,206,250 | Fill | July 2, 1940 |
| 2,282,040 | Doran | May 5, 1942 |
| 2,386,732 | Wohlhieter | Oct. 9, 1945 |
| 2,407,916 | Berg | Sept. 17, 1946 |

FOREIGN PATENTS

| Number | Country | Date |
|---|---|---|
| 374,128 | Italy | Aug. 16, 1939 |